United States Patent [19]

Nakamura et al.

[11] 4,024,036
[45] May 17, 1977

[54] PROTON PERMSELECTIVE SOLID-STATE MEMBER AND APPARATUS UTILIZING SAID PERMESELECTIVE MEMBER

[75] Inventors: Osamu Nakamura; Teruo Kodama, both of Ikeda; Isao Ogino, Minoo; Yoshizo Miyake, Toyonaka, all of Japan

[73] Assignee: Agency of Industrial Science & Technology, Tokyo, Japan

[22] Filed: Jan. 28, 1976

[21] Appl. No.: 653,219

[30] Foreign Application Priority Data

| Feb. 3, 1975 | Japan | 50-14553 |
| Mar. 17, 1975 | Japan | 50-32674 |
| Mar. 17, 1975 | Japan | 50-32675 |
| Mar. 17, 1975 | Japan | 50-32676 |

[52] U.S. Cl. ............................. 204/129; 204/295; 429/33; 429/193
[51] Int. Cl.[2] ..................... C25B 1/02; H01M 6/18
[58] Field of Search .......... 136/86 F; 204/129, 295; 429/33, 193

[56] References Cited

UNITED STATES PATENTS

| 3,276,910 | 10/1966 | Grasselli et al. | 136/86 F |
| 3,379,571 | 4/1968 | Piret | 136/86 F |
| 3,401,099 | 9/1968 | McEvoy | 204/129 |
| 3,497,389 | 2/1970 | Berger et al. | 136/86 F |

FOREIGN PATENTS OR APPLICATIONS

| 801,142 | 12/1968 | Canada | 136/86 F |

Primary Examiner—John H. Mack
Assistant Examiner—H. A. Feeley
Attorney, Agent, or Firm—Oblon, Fisher, Spivak, McClelland & Maier

[57] ABSTRACT

Disclosed is a proton permselective solid-state member which is formed of a heteropoly acid represented by the generic formula, $H_m[X_x \cdot Y_y \cdot O_z] \cdot nH_2O$, or a salt thereof. Said permselective member can be used as an electrolyte in the fuel cell and as a permselective membrane in the hydrogen gas refining system.

13 Claims, 5 Drawing Figures

PROTON PERMSELECTIVE SOLID-STATE MEMBER AND APPARATUS UTILIZING SAID PERMSELECTIVE MEMBER

BACKGROUND OF THE INVENTION

This invention relates to a novel proton permselective solid-state member which is usable in various electrochemical apparatuses such as electric cells like fuel cells and concentration cells, systems for production and refinement of hydrogen under the influence of electric field and hydrogen detectors, for example.

Generally as the electrolytes in fuel cells, there have heretofore been used liquid electrolytes such as potassium hydroxide and phosphoric acid. Because of the use of liquid electrolytes, these conventional fuel cells have entailed inconvenience of handling, leakage of liquid electrolytes and various other disadvantages. To take the place of such liquid electrolytes, there have recently been introduced to the art solid electrolytes such as, for example, an oxide ion conductive solid electrolyte formed of a solid solution of $ZrO_2$ and CaO. These solid electrolytes can substantially eliminate the disadvantages of said liquid electrolytes. Since they exhibit low levels of ionic conductivity, however, they have to be operated at temperatures in the neighborhood of 1,000° C. As a consequence, the amounts of energy required in operating electric cells utilizing such solid electrolytes are large. This fact directly implies that the devices and parts usable in said cells must be made of materials resistant to heat and corrosion. These solid electrolytes are disadvantageous in this respect. For the materialization of a fuel cell making use of a solid electrolyte, therefore, need is felt acutely for the development of a solid electrolyte which functions effectively at temperatures below 700° C.

An object of the present invention is to provide a proton permselective solid state member capable of exhihibiting an excellent ionic conductivity at temperatures around room temperatures up to a few hundred degrees centigrade.

SUMMARY OF THE INVENTION

To attain the object described above according to the present invention, there is provided a proton permselective solid-state member which is formed of at least one member selected from the group consisting of heteropoly acids of the generic formula, $H_m[X_xY_yO_z] \cdot nH_2O$, and salts of said acids. In the preceding generic formula, X stands for at least one member selected from the group consisting of boron, aluminum, gallium, silicon, germanium, tin, phosphorus, arsenic, antimony, bismuth, selenium, tellurium, iodine and the first, second and third transition metals, Y for at least one member selected from the first, second and third transition metals, providing that X and Y do not stand for one same substance, and $m$, $x$, $y$, $z$ and $n$ each for a positive numerical value.

Being in a solid state as mentioned above, the proton permselective member enjoys ease of handling. Since it exhibits excellent ionic conductivity, it provides outstanding effects when used in various electrochemical apparatuses such as partition walls in fuel cells and permselective membranes in systems for refining hydrogen gas.

The other objects and characteristic features of the present invention wil become apparent from the description to be given in full detail hereinbelow with reference to the accompanying drawing.

DETAILED DESCRIPTION OF THE INVENTION

The inventors conducted a series of studies in search for solid-state substances selectively permeable to protons. They have consequently acquired a knowledge that heteropoly acids of a specific type or salts thereof possess proton conductivity and that such a heteropoly acid or salt thereof, if used as the electrolyte in the fuel cell utilizing hydrogen gas or the like, eliminates the disadvantages experienced with the conventionally employed electrolytes. The present invention has been accomplished on the basis of this discovery.

To be specific, a shaped article formed of at least one member selected from the group consisting of heteropoly acids represented by the generic formula:

$$H_m[X_xY_yO_z] \cdot nH_2O \tag{1}$$

(wherein, X stands for at least one member selected from the group consisting of boron, aluminium, gallium,, silicon, germanium, tin, phosphorus, arsenic, antimony, bismuth, selenium, tellurium, iodine and the first, second and third transition metals, Y for at least one member selected from the first, second and third transition metals, providing that X and Y do not stand for one same substance, and $m$, $x$, $y$, $z$ and $n$ each for a positive numerical value.) or of salts of said acids possesses outstanding proton conductivity even at temperatures below 200° C despite its solid state and, therefore, functions as a proton permselective member.

Heteropoly acids or salts thereof described above have heretofore been used as reagents for elementary analysis and as precipitants in biochemical research. It has never been known at all that shaped article obtained by molding powdery crystals of such acids of salts under pressure or the single crystals of said acids or salts are selectively permeable to protons. The shaped article of such a heteropoly acid or salt thereof (hereinafter referred to as "permselective member of the present invention") possesses outstanding ionic conductivity such that, when said member is used as an electrolyte in the fuel cell, the fuel cell enjoys performance favorably comparable with that of the fuel cell using conventional liquid electrolyte and, moreover, eliminates the disadvantages heretofore experienced with the liquid electrolyte. Further, the permselective member of the present invention functions effectively even at temperatures below about 200° C and, therefore, is also free from the disadvantages suffered by the conventional solid electrolytes described above.

When the permselective member of the present invention is used as the partition wall in the fuel cell to intervene between the anode reaction chamber and the cathode reaction chamber of said fuel cell, it enables protons alone to be transferred from the anode chamber to the cathode chamber and exhibits impermeability to the gaseous anode reactant and the gaseous cathode reactant insofar as said reactants are in the form of simple substances, compounds or anions, indicating that the member is capable of functioning as what is called a "separator". The reason for the selective permeability which the permselective member of the present invention exhibits to protons as described above remains yet to be elucidated. A possible explanation may be that said transfer of protons occurs in much the same way as protons present in water move about in said water, namely that this transfer originates in the movement of protons by virtue of hydrogen bonds. It has been established by the pulsed NMR method that the permselective member of the present invention, despite its solid state, permits protons present therein to move as vigorously as if they were present in a liquid.

Of the poly acids resulting from the combination of inorganic acids, the "heteropoly acids" which are usable as described above in the permselective member of the present invention are limited to those which contain at least two metals or corresponding elements. This type of poly acid, namely the heteropoly acid, is formed when at least one of said two or more metals or corresponding elements functions as the central atom and the polyacid radical of the remaining metal (hereinafter referred to as "parent atom") is coordinated with said central atom.

It does not necessarily follow that said heteropoly acid possesses a definitely clear crystalline structure. However, it is generally accepted that anionic units, $[X_xY_yO_z]^{m-}$, are regularly arranged within crystals; that these large anions are linked by cations, $(H_m \cdot nH_2O)^{m115}$, and that the hydrogen ions within said cations are linked with water molecules (water of crystallization) by virtue of hydrogen bonds and the water molecules also are mutually bonded by hydrogen bonds. Since the spaces intervening between said anions are large, it is possible that they admit tens of water molecules of crystallization.

In The generic formuls (1) described above, X stands for the central atom and Y for the parent atom. The central atom (X) can be that of at least one element selected from the group consisting of typical elements such as boron, alumminum, gallium, silicon, germanium, tin, phosphorus, arsenic, antimony, bismuth, selenium, tellurium and iodine and the first, second and third transition metals. Of the group of elements mentioned above, the first transition metals are those transition metals belonging to the fourther period of the Periodic Table of Elements. Examples include scandium, titanium, vanadium, chromium, manganese, iron, cobalt, nickel, copper and zinc. The second transition metals are those transition metals belonging to the fifth period of the Periodic Table of Elements, examples including niobium, yttrium, zirconium, molybdenum, technetium, ruthenium, rhodium, palladium and cadnium. And the third transition metals are those transition metals belonging to the sixth period of the Periodic Table of Elements, examples including those of the lanthanide series such as lanthanum, cerium, praseodymium, neodymium, promethium, samarium and europium, and hafnium, tantalum, rhenium, osmium, irridium, tungsten, gold and mercury.

The parent atom can be that of at least one element selected from the group consisting of the same first, second and third transition metals as are available for the central atom. Typical examples of the elements include molybdenum, tungsten, vanadium, niobium and tantalum. It is provided, however, that both X and Y can not stand for one same element. In the generic formula (1), $m$, $x$, $y$ and $z$ are not required to be specifically limited, for they may suitably be selected in accordance with the combination of the central atom (X) and the parent atom (Y), the conditions of production and especially $n$ may be selected in accordance with the reaction temperature. It is, nevertheless, desirable that $m$ be selected from the range of 2 to 10, $y$ from the range of 6 to 12 based on $x$ taken as 1 and $n$ from the range of 3 to 100. The salt of the heteropoly acid represented by the generic formula (1) mentioned above may likewise be used to produce the permselective member of the present invention. Examples of the salts of said heteropoly acids which are thus usable for the present invention include alkali metal salts such as sodium salts, potassium salts, cesium salts and rubidium salts, alkaline earth metal salts such as magnesium salts, calcium salts, and barium salts, transition metal salts such as of Cr, Mn, Fe, Co, Ni, Cu, Zn and ammonium salts such as of Al, Ga, In, Sn, Pb, guanidium salts and other various amines.

The heteropoly acids and salts thereof described above can be produced by ordinary methods. These compounds are now divided into several typical groups, according to the ratio of the number of central atoms to that of parent atoms, the number of central atoms and the coordination number of central atoms. And methods employed for the production of such typical groups of compounds will be summarized hereinbelow.

1. Compounds in which the coordination number of central atoms is 4 and the number of central atoms is 1:
   a. Compounds in which the ratio of the number of central atoms to that of parent atoms is 1 : 12

A compound of the formula, $H_3[PMo_{12}O_{40}]\cdot nH_2O$ for example, can be obtained by heating ortho-phosphoric acid and molybdenum oxide or by adding concentrated nitric acid to an aqueous solution of the mixutre of ortho-phosphoric acid with sodium molybdate under boiling water bath.

b. Compounds in which the ratio of the number of central atoms to that of parent atoms is 1 : 11

A compound of the formula, $H_7[PW_{11}O_{39}]\cdot nH_2O$ for example, can be obtained by adjusting to a pH value of 4–5 the aqueous solution of $H_3[PW_{12}O_{40}]\cdot nH_2O$ which is obtained by following the procedure of (a) above with necessary modifications. A compound belonging to this group except for having two or more central atoms such as, for example, a compound of the formula of $(NH_4)_7\cdot[SiCO(II)W_{11}O_{40}]\cdot nH_2O$ can be obtained by adjusting to a pH value 7 the aqueous solution of $H_4[SiW_{12}O_{40}]\cdot nH_2O$ which is obtained by following the procedure of (a) above with necessary modifications and subsequently adding thereto the aqueous solutions of cobaltous chloride and ammonium chloride in the order mentioned.

2. Compounds in which the coordination number of central atoms is 4 and the number of central atoms is 2:

a. Compounds in which the ratio of the number of central atoms to that of parent atoms is 2:18

A compound of the formula, $K_6[P_2W_{18}O_{62}]\cdot nH_2O$ for example, can be obtained by either heating a concentrated aqueous solution of $H_3[PW_{12}O_{40}]\cdot nH_2O$ which is obtained by following the procedure of (1)-(a) above with necessary modifications or adding an aqueous solution of potassium chloride to what is obtained by adding ortho-phosphoric acid to said concentrated aqueous solution.

b. Compounds in which the ratio of the number of central atoms to that of parent atoms is 2:17

A compound of the formula, $K_{10}[P_2W_{17}O_{61}]\cdot nH_2O$ for example, can be obtained by first adjusting to a pH value 5 the aqueous solution of $H_6[P_2W_{18}O_{62}]\cdot nH_2O$ which is obtained by following the procedure of (2)-(a) above with necessary modifications and thereafter adding an aqueous solution of potassium chloride. A compound belonging to this group except for having more than two central atoms, such as, for example, a compound of the formula, $K_8[H_2P_2Mn(II)W_{17}O_{62}]\cdot nH_2O$, can be obtained by first adjusting to a pH value of 6–7 the aforementioned compound $H_6[P_2W_{18}O_{62}]\cdot nH_2O$, then adding thereto an aqueous solution of manganese sulfate and thereafter adding an aqueous solution of potassium chloride.

3. Compounds in which the coordination number of central atoms is 6 and the ratio of the number of central atoms to that of parent atoms is 1:6:

A compound of the formula, $(NH_4)_6[Te(VI)Mo_6O_{24}]\cdot nH_2O$ for example, can be obtained by mixing telluric acid with an aqueous solution of ammonium molybdate.

4. Compounds in which the coordination number of central atoms is 6 and the ratio of the number of central atoms to that of parent atoms is 1:9:

A compound of the formula, $(NH_4)_6[,MnMo_9O_{32}]\cdot nH_2O$ for example, can be obtained by adding to an aqueous solution of para-ammonium molybdate an aqueous solution of ammonium persulfate and sulfuric acid both in excess amounts, boiling the resultant mixture and thereafter adding thereto an aqueous solution of manganese sulfate.

5. Compounds in which the coordination number of central atoms is 20 and the ratio of the number of central atoms to that of parent atoms is 1:12:

A compound of the formula, $(NH_4)_4[CeMo_{12}O_{42}]\cdot nH_2O$ for example, can be obtained by boiling an aqueous solution of para-ammonium molybdate and adding thereto ammonium serium (IV) nitrate.

The compounds described above are subsequently separated from the respective reaction solutions by ordinary methods of separation such as, for example, a method resorting to recrystallizaion and a metod relying upon vaporization of water content. Generally, they are isolated in the form of powder or single crystals.

Heteropoly acids and salts thereof other than those described above can also be easily obtained by employing the aforementioned procedures with necessary modifications.

If a heteropoly acid or salt thereof which is produced by one of the methods described above is in the form of powdery crystals, it can be compression molded to a desired shape at normal room temperature under a pressure of not less than 100 kg/cm². A compressive force of less than 100 kg/cm² proves to be undesirable, because under such a pressure, although the acid or salt may apparently be molded, the perm-selective member has, during the step of molding, a possibility of enclosing therein fine pores passable to a gaseous substance. Optionally two or more heteropoly acids or salts thereof may suitably be mixed and molded to produce the permselective member of this invention.

The desired shaping of the permselective member can be obtained by employing any of the known methods such as of compression molding and roll molding. As the first step, powdery crystals of a given heteropoly acid or salt thereof are finely pulverized, placed in a suitable mold and then compressed. Desirably a fluorine resin may be added to the powder in the mold, so that the resultant molded article will enjoy a marked improvement in its mechanical strength.

When phosphomolybdic acid $(H_3[PMo_{12}O_{40}]\cdot 30H_2O$ in a powdery form was compression molded under a pressure of 1,000 kg/cm² into a plate measuring 15 mm × 15 mm × 2 mm, the plate was measured to have a specific resistance of 11 $\Omega$cm and a bending strength of 37.9 kg/cm³. When said powder of acid was mixed with a different proportion of ethylene tetrafluoride powder as indicated in Table 1 and the plate obtained by compression molding the resultant mixture was measured for specific resistance and bending strength, the results were as shown in Table 1.

Table 1

| Amount of ethylene tetrafluoride added (in % by weight) | Specific resistance (in $\Omega$cm) | Bending strength (in kg/cm³) |
| --- | --- | --- |
| 0 | 11 | 37.9 |
| 0.5 | 11.5 | 75.8 |
| 4.8 | 12.0 | 52.0 |
| 20.0 | 31.0 | 64.9 |
| 40.0 | 102.0 | 71.4 |
| 80.0 | 674.0 | 82.1 |

As is evident from the foregoing table, addition of not more than 1% by weight of a fluorine resin results in an ample increase in the mechanical strength without entailing any appreciable decline in the ionic conductivity. The ionic conductivity, however, declines in proportion as the amount of the fluorine resin to be added increases. It is, therefore, necessary to select the amount of addition which best suits the purpose for which the molded permselective member is used.

A single crystal of the heteropoly acid or salt thereof possesses in itself outstanding mechanical strength. Instead of being subjected to compression molding, therefore, it may be cut to a desired shape and suitably fabricated to satisfy some uses.

The single crystal described above can be obtained by placing one seed crystal in an aqueous solution saturated with the same heteropoly acid or salt and gradually lowering the temperature of the solution over a long time. When the saturated solution is lowered by 5° C from 20° C over a period of 10 days, for example, the seed crystal therein gradually gains in growth easily to give rise to a single crystal. A single crystal of a desired size can be obtained by varying the time and/or temperature.

Examples of heteropoly acids and salts which are usable for the present invention are cited in Table 2. As regards the specific resistance indicated in the table, a given sample was compression molded into a plate measuring 15 mm × 15 mm × 2 mm under a pressure of 1,000 kg/cm² if the sample was in the form of powdery crystals. In the case of a sample which was in the form of a single crystal, it was fabricated to the same dimensions. Each test piece obtained as above was tested for specific resistance by the AC bridge method at a fixed frequency of 1 kHz at normal room temperature. For the purpose of comparison, an oxide ion conductive solid solution of $ZrO_2$ and $CaO$ and a sodium ion-electroconductive sintered solid of $\beta$-$Al_2O_3$ which both have heretofore been known as solid electrolytes were tested for specific resistance by the same procedure as described above. The results are shown in the table.

Table 2

| Run No. | Compound | Specific resistance (in Ωcm) |
|---|---|---|
| 1 | $H_3[PMo_{12}O_{40}] \cdot 30H_2O$ | 11 |
| 2 | " (single crystal) | 5 |
| 3 | $H_3[PW_{12}O_{40}] \cdot 30H_2O$ | 12 |
| 4 | "(single crystal) | 7 |
| 5 | $(NH_4)_3[PMo_{12}O_{40}] \cdot 3H_2O$ | 21 |
| 6 | $K_3[PMo_{12}O_{40}] \cdot 6H_2O$ | 22 |
| 7 | $Na_3[PMo_{12}O_{40}] \cdot 21H_2O$ | 17 |
| 8 | $(NH_4)_3[PW_{12}O_{40}] \cdot 3H_2O$ | 20 |
| 9 | $K_3[PW_{12}O_{40}] \cdot 6H_2O$ | 20 |
| 10 | $Na_3[PW_{12}O_{40}] \cdot 21H_2O$ | 19 |
| 11 | $H_4[SiMo_{12}O_{40}] \cdot 26H_2O$ | 12 |
| 12 | $Na_4[SiMo_{12}O_{40}] \cdot 22H_2O$ | 24 |
| 13 | $H_4[SiW_{12}O_{40}] \cdot 30H_2O$ | 13 |
| 14 | $Na_4[SiW_{12}O_{40}] \cdot 22H_2O$ | 22 |
| 15 | $H_5[BW_{12}O_{40}] \cdot 30H_2O$ | 13 |
| 16 | $K_6[P_2W_{18}O_{62}] \cdot 14H_2O$ | 123 |
| 17 | $K_{10}[P_2W_{17}O_{61}] \cdot 22H_2O$ | 131 |
| 18 | $(NH_4)_6[TeMo_6O_{24}] \cdot 7H_2O$ | 326 |
| 19 | $(NH_4)_8[CeMo_{12}O_{42}] \cdot 8H_2O$ | 281 |
| 20 | $(NH_4)_6[MnMo_9O_{32}] \cdot 8H_2O$ | 235 |
| 21 | $Na_5[IW_6O_{24}] \cdot 8H_2O$ | 235 |
| 22 | $(CN_3H_6)_6[TeW_6O_{24}] \cdot 3H_2O$ | 520 |
| 23 | $(NH_4)_3H_4[AsW_{12}O_{42}] \cdot 4H_2O$ | 311 |
| 24 | $H_4[GeW_{12}O_{42}] \cdot 30H_2O$ | 73 |
| 25 | $K_2[SeMo_6O_{21}] \cdot 6H_2O$ | 217 |
| 26 | $Na_3[AlMo_6O_{21}] \cdot 11H_2O$ | 195 |
| 27 | $K_4[ZrMo_{12}O_{40}] \cdot 18H_2O$ | 188 |
| 28 | $Na_8[ThMo_{12}O_{42}] \cdot 15H_2O$ | 224 |
| 29 | $(NH_4)_8[SnMo_{12}O_{42}] \cdot 20H_2O$ | 161 |
| Reference | | |
| 1 | $ZrO_2$-$CaO$ (solid solution) | 10,000 (600° C) 40 (1,000° C) |
| 2 | $\beta$-$Al_2O_3$ | 700 (room temperature) 14 (300° C) |

It is seen from Table 2 above that the permselective members of the present invention show extremely low degrees of specific resistance as compared with the conventional solid electrolytes and hence enjoy outstanding ionic conductivity. Coulometry has shown the ion transportation coefficients of these permselective members invariably to be within experimental error 1. Generally, the specific resistance is lower in the permselective members formed of heteropoly acids than in the permselective members formed of corresponding salts and the magnitude of specific resistance tends to decline in proportion as the amount of water of crystallization increases.

Figure 1:
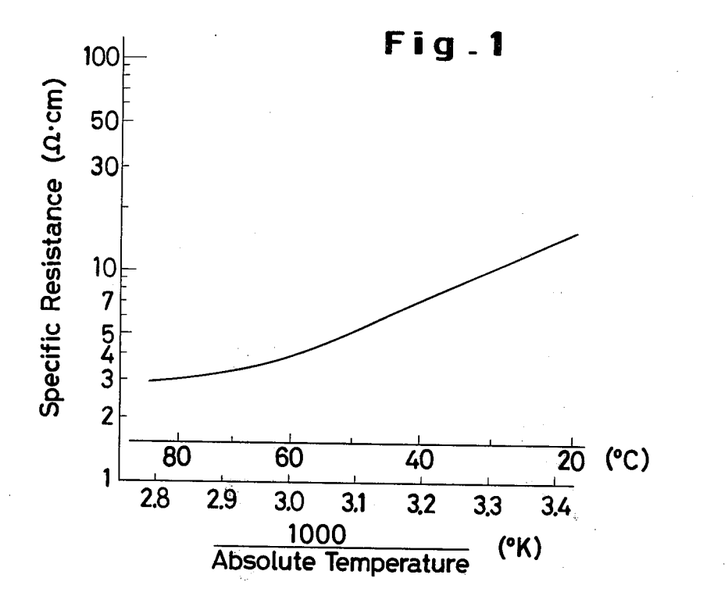
FIG. 1 is a graph showing the relation between specific resistivity and inverse temperature of one preferred embodiment of the proton permselective member according to the present invention.

A permselective member formed of the powder of $H_3[PMo_{12}O_{40}] \cdot 30H_2O$, which is one of the compounds cited in Table 2, was tested for specific resistance at varying temperatures. FIG. 1 is a graph showing the specific resistance of said permselective member as the function of temperature. The measurement of specific resistance was performed by the same method under the same conditions as described above. It is noted from FIG. 1 that the specific resistance of said permselective member under frequency 1 kHz is about 10 Ωm at 30° C, about 7 Ωm at 40° C and about 3.5 Ωm at 60° C respectively. During the measurement, the applied frequency was varied from 100 Hz to 30 kHz, only to demonstrate that the results obtained at other frequencies were identical with those obtained at 1 kHz. This fact indicates complete absence of frequency dependency.

As described above, the permselective member of the present invention not merely possesses proton conductivity but also enjoys extremely high proton conductivitity and, therefore, can be used as the solid electrolyte in the fuel cell utilizing hydrogen gas in addition to being usable in various electrochemical apparatuses. Particularly when the permselective member of the present invention is used as the partition wall in a various electrochemical apparatus, it invariably functions as an effective barrier with respect to the nonionic mass transfer of gaseous cathode and anode reactants, the flow of anions and cations of the gaseous reactants except for protons and the flow of electrons.

Now, one preferred embodiment of the fuel cell using, as its partition wall, the hydrogen ion permselective member of the present invention will be described with reference to FIG. 2.

Figure 2:
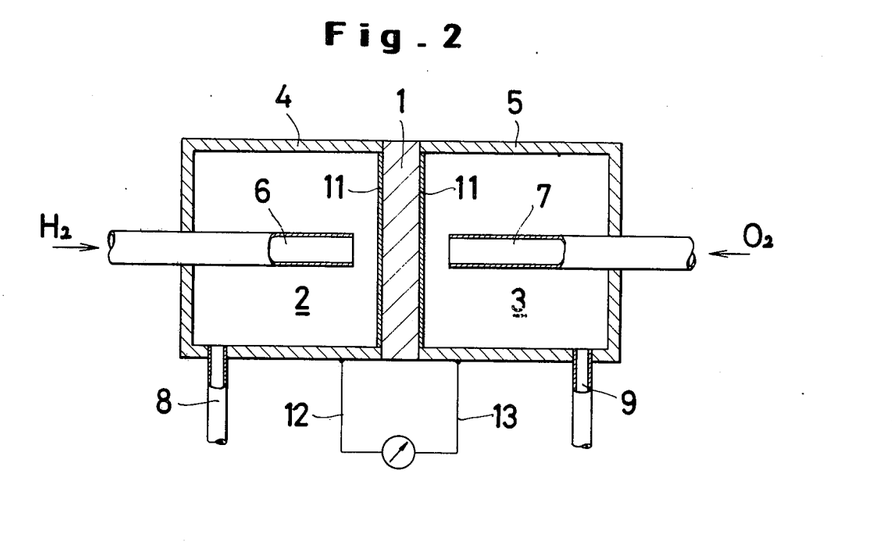
FIG. 2 is a cross section illustrating one preferred embodiment of the fuel cell using, as the partition wall thereof, the permselective member of the present invention.

In the apparatus illustrated in FIG. 2, a metal receptacle 4 incorporating a hydrogen inlet tube 6 and a hydrogen outlet tube 8 and having one side left open and another metal receptacle 5 incorporating an oxygen inlet tube 7 and an oxygen outlet tube 9 and having one side left open are disposed in such a relative position that said open sides confront each other. The two receptacles are airtightly held against both sides of the hydrogen ion permselective member 1 of the present invention so as to form an anode chamber 2 and a cathode chamber 3. On the surface of said permselective member, there is disposed a catalyst 11 which is of the type usually made of platinum, palladium, cobalt molybdate, Raney nickel or Raney silver and soon used in the fuel cell. Leading wires 12 and 13 are attached at suitable positions to the receptacles 4 and 5 so as withdraw the electric current generated inside the apparatus.

When hydrogen and oxygen are supplied to the anode chamber 2 and the cathode chamber 3 respectively through the hydrogen inlet tube 6 and the oxygen inlet tube 7, the hydrogen molecule received in the anode chamber 2 is separated by virtue of the catalyst 11 into hydrogen ions and electrons and the hydrogen ions alone are permitted to pass through the permselective member 1 and enter the cathode chamber 3. The oxygen received in the cathode chamber 3 allowed to combine with the electrons travelling through the external circuit (leading wire) to give rise to oxygen ions. The oxygen ions are allowed to combine with the hydrogen ions to give rise to water. Consequently, the electrons flow from the anode chamber to the cathode chamber through the external circuit. The reactions described above are expressed by the following formulas:

$$\left.\begin{array}{l}\text{anode Chamber } H_2 \longrightarrow 2H^+ + 2e^- \\ \text{cathode chamber } \tfrac{1}{2}O_2 + 2e^- \longrightarrow O^{2-} \\ \hline H_2 + \tfrac{1}{2}O_2 \longrightarrow H_2O\end{array}\right\} \quad (2)$$

The electromotive force, E, which occurs in the external circuit in consequence of the reactions is expressed by the formula (3) below:

$$E = E_o + \frac{RT}{nF} \cdot \ln \cdot \frac{c^{p^*}H_2O}{a^{p^*}H_2 \cdot c^{p^*}O_2} \quad (3)$$

wherein, $a^{p^*}H_2$, $c^{p^*}O_2$, and $c^{p^*}H_2O$ stand for the partial pressure of hydrogen in the anode chamber, the partial pressure of oxygen in the cathode chamber and the partial pressure of steam in the cathode chamber resectively and $E_o$, R, T, F and n stand for the standard electromotive force, the gas constant, the absolute temperature, the Faraday constant and the number of electrons respectively.

When the partial pressure of oxygen and the partial pressure of steam in the cathode chamber are rendered constant, the magnitude of the electromotive force E constitutes itself a linear function of the logarithm of the partial pressure of hydrogen in the anode chamber. By the same token, the electromotive force E varies with the partial pressure of oxygen in the cathode chamber.

Figure 3:
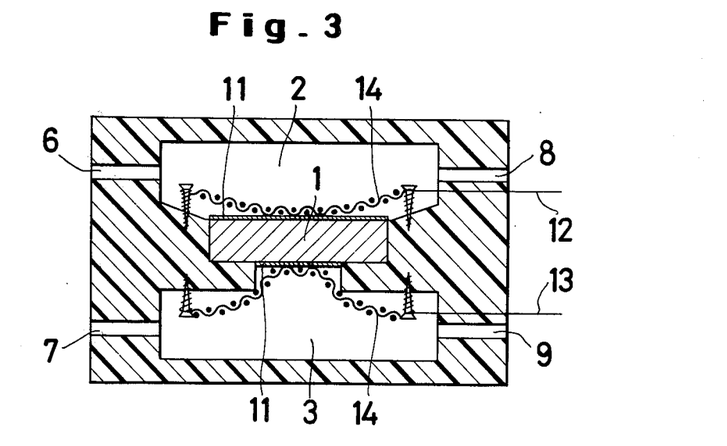
FIG. 3 is a cross section illustrating another preferred embodiment of the fuel cell using, as the partition wall thereof, the permselective member of the present invention.

FIG. 3 illustrates another preferred embodiment of the fuel cell utilizing the proton permselective member of the present invention.

In the illustrated apparatus, a tightly closed tank made of a synthetic resin has its interior divided into an anode chamber and a cathode chamber by stationarily disposing the permselective member of this invention at the center of said tank. On each of the portions of said permselective member which confront said two chambers, there is disposed a catalyst layer 11 on which a platinum gauze 14 is disposed in such a way as to be electrically connected to said catalyst layer. To the platinum gauzes 14, leading wires 12 and 13 are connected. The other ends of these leading wires are led out of the tank proper. The anode chamber 2 is provided with a hydrogen feed inlet 6 and a discharge outlet 8 and the cathode chamber 3 is provided with an oxygen feed inlet 7 and a discharge outlet 9.

When hydrogen and oxygen gases are supplied respectively through the hydrogen feed inlet and the oxygen feed inlet, an electric current is generated in the leading wires 12 and 13 in the same way as described above with reference to the apparatus of FIG. 2.

Now a hydrogen gas production system utilizing the proton permselective member of the present invention will be described with reference to FIG. 4.

Fundamentally, said hydrogen gas production system is similar to the fuel cell illustrated in FIG. 2 or the one illustrated in FIG. 3. To be specific, it comprises a tightly closed tank made of a synthetic resin and a permselective member 1 disposed stationarily at the center of said tank so as to divide the interior of the tank airtightly into an anode chamber 2 and a cathode chamber 3. Each of the surfaces of the permselective member 1 confronting the two chambers is covered with a platinum gauge 14 which is disposed so as to be connected with the permselective member via a catalyst layer 11. The platinum gauzes 14 function as an anode and a cathode respectively and leading wires 12 and 13 are connected to these platinum gauzes. The other ends of the leading wires are lead out of the tank proper. The anode chamber 2 is provided with a steam feed inlet 7 and a discharge outlet 9 and the cathode chamber 3 is provided with a hydrogen feed inlet 6 and a discharge outlet 8.

First, the interior of the cathode chamber is displaced with hydrogen gas which is introduced via the hydrogen feed inlet 6 and reduced in pressure to the neighborhood of 0.1 atmosphere. Then a direct current voltage is applied through the leading wires 12 and 13. Subsequently, steam is introduced under pressure through the steam feed inlet 7 into the anode chamber 2, in which the steam is caused by the catalyst to undergo a reaction expressed by the formula, $2H_2O \rightarrow 4H^+ + O_2 + 4e^-$. Of the reaction products, protons alone are permitted to pass through the permselective member 1, enter the cathode chamber 3 and combine with the electrons given through the leading wire 12 from the outer electron sink, with the result that hydrogen gas having a purity close to 100% is obtained. In the meantime, the unaltered steam and the formed oxygen are recovered via the discharge outlet 9. The description made so far has presumed the system to be operable batchwise. The same system can easily be operated continuously, however, by having the supply of gases and the recovery of the product carried out continuously.

Figure 4:
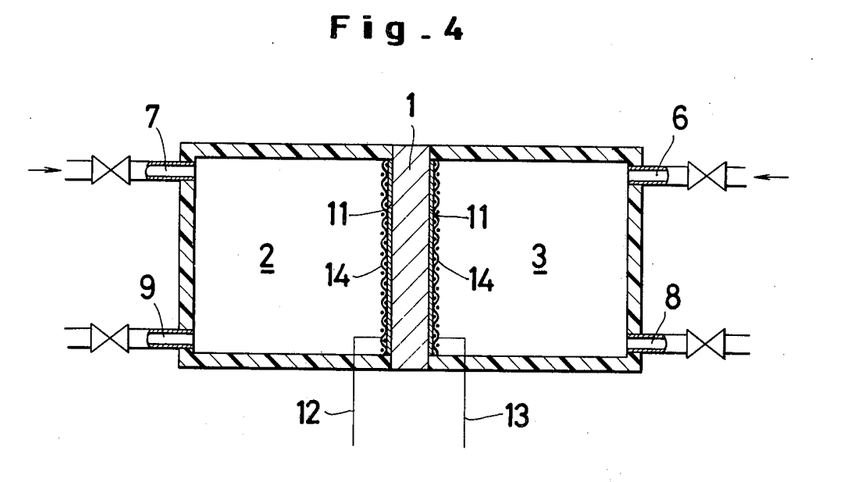
FIG. 4 is a cross section illustrating one preferred embodiment of the hydrogen recovery system using the premselective member of the present invention.

Isolation of hydrogen gas from a hydrogen-containing gas can be accomplished by introducing under pressure said hydrogen-containing gas into the anode chamber 2 of the system illustrated in FIG. 4 and applying the D.C. voltage. Consequently, the hydrogen present in said gas is ionized and the protons alone are permitted to pass through the permselective member 2 and enter the cathode chamber 3, with the result that hydrogen gas having a purity close to 100% is recovered from the cathode chamber 3.

Figure 5:
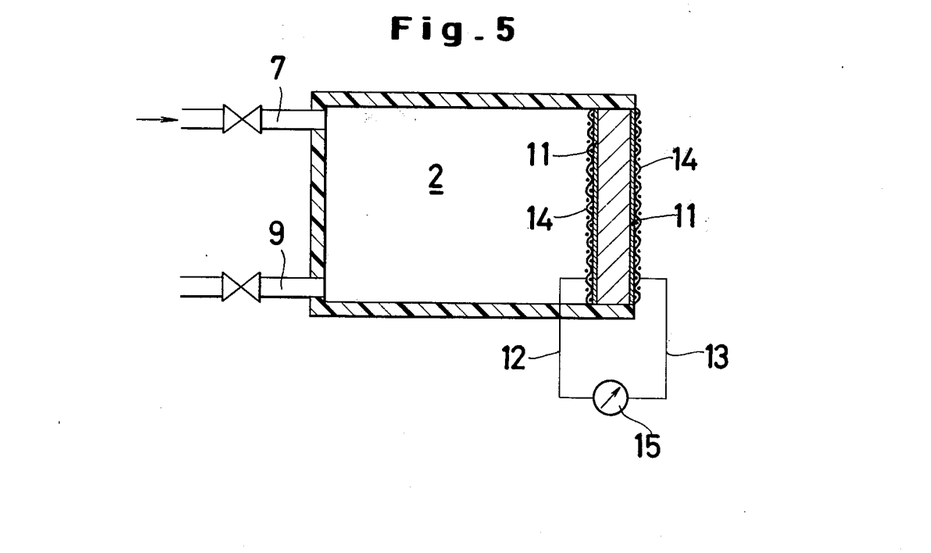
FIG. 5 is a cross section illustrating one preferred embodiment of the hydrogen gas detection system using the permselective member of the present invention.

FIG. 5 illustrates one preferred embodiment of the apparatus for measuring the partial pressure of hydrogen gas or oxygen gas by use of the permselective member of the present invention.

The apparatus illustrated in FIG. 5 comprises a receptacle of synthetic resin incorporating a gas feed inlet 7 and a discharge outlet 9 and having one side left open and a permselective member 1 of the present invention disposed on said open side of the receptacle so as to serve as an airtight lid for the receptacle. Each of the opposed surfaces of said permselective member is adjoined by a platinum gauze 14, with a catalyst layer 11 intervening therebetween. Leading wires 12 and 13 are connected to these platinum gauzes 14 and the other ends of these leading wires are connected to a voltmeter 15.

In the detection of oxygen gas, hydrogen gas is introduced through the gas feed inlet 7 into the receptacle and a gas under test is brought into contact with the permselective member 1 proper. If the gas under test contains oxygen, the oxide ions are combined with protons which have been produced within the receptacle and subsequently permitted to pass through the permselective member, with the result that the combination of said ions gives birth to electromotive force and the occurrence of this electromotive force is indicated on the voltmeter 15. For a fixed partial pressure of hydrogen, the magnitude of the electromotive force varies in proportion with the partial pressure of oxygen as is expressed by the aforementioned formula (2). The partial pressure of oxygen present in the gas under test, therefore, can easily be measured by having the partial pressure of hydrogen within the receptacle maintained at a fixed value during the measurement.

Then in the detection of hydrogen gas, the receptacle is filled with oxygen and the permselective member 1 is exposed to contact with a gas under test. As the result the presence of hydrogen gas can be detected and the magnitude of the partial pressure of hydrogen can be measured similarly to the detection of oxygen gas described above.

It will be apparent that said detection and measurement can likewise be accomplished by use of the apparatus illustrated in FIG. 4. For this purpose, one of the chambers in the apparatus is filled with oxygen (or hydrogen) and the remaining chamber is filled with or swept by a gas under test. Owing to the principle described above, electromotive force is consequently generated insofar as the gas under test contains hydrogen (or oxygen). Occurrence of such electromotive force and the magnitude thereof are indicated on a voltmeter which is to be connected to the leading wires 12 and 13.

As described above, the proton permselective member obtained by the present invention is in a solid state and, therefore, permits ease of handling and overcomes drawbacks ascribable to liquid state and, what is more, enjoys outstanding ionic conductivity even at normal room temperature. Thus, it can be easily utilized in various electrochemical apparatuses to bring about excellent effects. Typical examples of apparatuses in which the permselective member of the present invention can effectively be utilized are cited hereinbelow.

1. An electric cell in which electrochemically reactive oxidizing member and reducing member are disposed in direct contact with the opposed sides of the intervening perm-selective member of the present invention serving as a solid separator to keep said two members isolated from each other.

2. A fuel cell which utilizes the permselective member of this invention as a solid separator and uses hydrogen gas.

3. An apparatus for isolation and purification of hydrogen gas, which utilizes the permselective member of this invention as a solid separator capable of electrically filtering a hydrogen-containing mixed gas to effect separation of protons therefrom.

4. An apparatus in which the permselective member of the present invention is utilizes as a solid separator and the operation involved in the apparatus of (2) above is effected reversely so as to effect electrochemical manufacture of hydrogen gas and oxygen gas from water.

5. A concentration cell in which the permselective member of the present invention is utilized as a solid separator and hydrogen gas is used as electrodes.

6. A hydrogen gas detector which utilizes the permselective member of the present invention as a solid separator and adopts the operating principle of said concentration cell. Now, working examples of the present invention will be cited hereinbelow. It should be noted, however, that the present invention is not limited in any way to these examples.

EXAMPLE 1

In 100 ml of water, 30.5g of 25% ortho-phosphoric acid was dissolved. While the resultant solution was boiled, 35g of molybdenum oxide ($MoO_3$) was added. The mixture was then maintained at about 100° C for 3 hours. At the end of the reaction, the reaction product was filtered to remove insolubles. The filtrate was shaken with added ether and then left to stand. Consequently the mixture was separated into three layers. From the separated later, the oily phase forming the lowest layer was withdrawn and then diluted with an equal volume of water and thereafter bubbled with clean air to volatilize the ether component. When the resultant aqueous solution was dehydrated in a desiccator over the potassium hydroxide, there was obtained 19.8g of $H_3[PMo_{12}O_{40}]$ in the form of powdery crystals.

In 40ml of water at 20° C, 390g of the powdery crystals obtained by the above-mentioned method was dissolved to form a saturated solution. Thereafter, one seed crystal of $H_3[PMo_{12}O_{40}]\cdot 30H_2O$ weighing about 1mg was placed in said saturated solution. The temperature of the solution was caused to fall to 15° C over a period of 10 days. Consequently, said seed crystal gradually gained in growth and finally gave birth to a single crystal of $H_3[PMo_{12}O_{40}]\cdot 30H_2O$ measuring approximately 20 mm × 15 mm × 20 mm.

A portion of said powdery crystals of $H_3[PMo_{12}O_{40}]\cdot 30H_2O$ was finely pulverized and then compression molded into a plate measuring 15 mm × 15 mm × 2 mm under a pressure of 1,000 kg/cm². Said single crystal of $H_3[PMo_{12}O_{40}]\cdot 30H_2O$ was fabricated into a plate measuring 15 mm × 15 mm × 2 mm. The test pieces thus obtained were tested for specific resistance by the AC bridge method using an alternating current at 1 kHz at normal room temperature and were found to have 11 $\Omega$cm and 5 $\Omega$cm of specific resistance.

Another 35.1-g portion of said powdery crystals of $H_3[PMo_{12}O_{40}]\cdot 30 H_2O$ was dissolved in 20ml of water. Three aliquots of the resultant solution were separately agitated with ammonium chloride, potassium chloride and sodium chloride added each in the amount of 1.2g and heated at 30° C and thereafter filtered or concentrated. Consequently, there were obtained $(NH_4)_3[PMo_{12}O_{40}]\cdot 3H_2O$, $K_3[PMo_{12}O_{40}]\cdot 6H_2O$ by the filtering treatment and $Na_3[PMo_{12}O_{40}]\cdot 21H_2O$ by the concentrating treatment in the form of powdery crystals in the respective amounts of 6.7g, 7.1g and 5.2g. When test specific resistance, they were found to have 21, 22 and 17 $\Omega$cm of specific resistance.

EXAMPLE 2

The procedure of Example 1 was faithfully repeated, except that tungsten oxide was used in place of molybdenum oxide. Consequently there were obtained powdery crystals and a single crystal of $H_3[PW_{12}O_{40}]\cdot 30H_2O$. Then, test pieces were prepared form these crystals in the same way as described in Example 1 and tested for specific resistance. They were found to have 12 and 7 $\Omega$cm of specific resistance.

Another portion of said powdery crystals of $H_3[PW_{12}O_{12}O_{40}]\cdot 30H_2O$ was dissolved in water. Similarly to Example 1, three aliquots of the resultant solution were agitated and heated separately with ammonium chloride, potassium chloride and sodium chloride. Consequently, there were obtained $(NH_4)_3[PW_{12}O_{40}]\cdot 3H_2O$, $K_3[PW_{12}O_{40}]\cdot 6H_2O$ and $Na_3[PW_{12}O_{40}]\cdot 21H_2O$ in the form of powdery crystals. When they were compression molded and the resultant test pieces were tested for specific resistance, they were found to have 20, 20 and 19 Ωcm of specific resistance.

EXAMPLE 3

The procedure of Example 1 was faithfully repeated, except that silicic acid ($H_2SiO_3$) was used in place of phosphoric acid. Consequently, there was obtained 12.1g of $H_4[SiMo_{12}O_{40}]\cdot 26H_2O$ in the form of powdery crystals. A test piece prepared of said powdery crystals in the same way as described in Example 1 was tested for specific resistance and was found to have 12 Ωcm of specific resistance.

When said powdery crystals of $H_4[SiMo_{12}O_{40}]\cdot 26H_2O$ were dissolved in water and the resultant solution was agitated and heated with added sodium chloride in the same way as described in Example 1, there were obtained powdery crystals of $Na_4[SiMo_{12}O_{40}]\cdot 22H_2O$. A test piece obtained by compression molding these powdery crystals was tested for specific resistance and was found to have 24 Ωcm of specific resistance.

EXAMPLE 4

In 30ml of water, 500g of the powdery crystals of $H_3[PW_{12}O_{40}]\cdot 30H_2O$ obtained in Example 2 was dissolved. The resultant aqueous solution was maintained at 90° C and left to stand for 2 weeks. At the end of said standing, 50g of potassium chloride was added to said aqueous solution. The mixture was filtered to remove therefrom the formed precipitate and then dehydrated. Consequently, there was obtained 420g of yellow $K_6[P_2W_{18}O_{62}]\cdot 14H_2O$ in the form of powdery crystals. A test piece was obtained by compression molding said powdery crystals in the same way as described in Example 1 and was tested for specific resistance. It was found to have 123 Ωcm of specific resistance.

EXAMPLE 5

While 1,000 ml of a 0.25M aqueous solution of ammonium para-molybdate was kept in a boiled state, 1,000 ml of an ammonium 5% cerium (IV) nitrate solution was added. The precipitate consequently formed was added to saturate a dilute sulfuric acid at 65° C, then deprived of insolubles and thereafter cooled. To the resultant solution was added 100 ml of a saturated solution of ammonium nitrate. The product consequently educed was separated by filtration to obtain 19.7g of yellow $(NH_4)_8[CeMo_{12}O_{42}]\cdot 8H_2O$ in the form of powdery crystals. By following the procedure of Example 1, a test piece was formed of these powdery crystals and was tested for specific resistance. It was found to have 281 Ωcm of specific resistance.

EXAMPLE 6

To 1,000ml of a boiling saturated solution of sodium paramolydbate, excess amounts of (1,000ml) an aqueous solution of manganese sulfate and (10ml) sulfuric acid were added to convert said sodium paramolydbate into metamolybdate ions. Subsequently, 50ml of an ammonium persulfate solution was added thereto. Then, the solution was heated until it becomes a saturated solution and cooled to permit eduction of crystals. The educed crystals were recrystallized from water to obtain 1.2g of $(NH_4)_6[MnMo_9O_{32}]\cdot 8H_2O$ in the form of powdery crystals. By following the procedure of Example 1, a test piece was formed of said powdery crystals and was tested for specific resistance. It was found to have 235 Ωcm of specific resistance.

EXAMPLE 7

Figure 6:
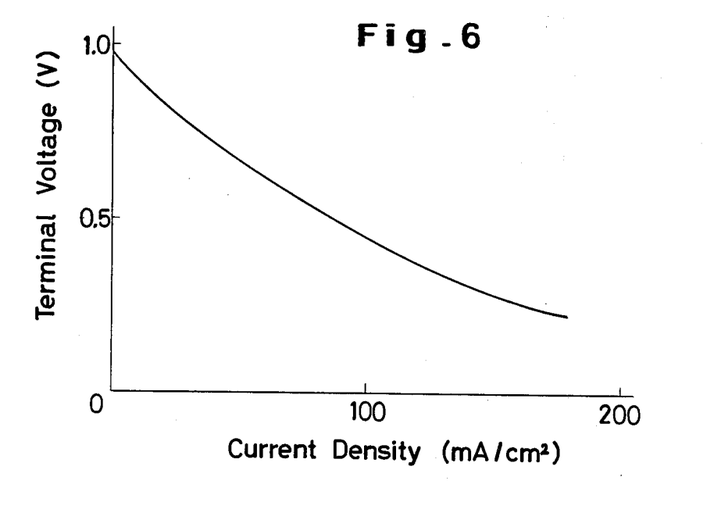
FIG. 6 is a graph showing the relation between voltage and amperage measured of the fuel cell using the permselective member as one preferred embodiment of the present invention.

In a fuel cell having a structure like the one illustrated in FIG. 2, a shaped piece (measuring 2.5cm² in surface area and 1.5mm in thickness) formed of the compound $H_3[PMo_{12}O_{40}]\cdot 30H_2O$ obtained in Example 1 was used as the partition wall, with a sheet of platinum black attached as a catalyst to each of the surfaces of the partition wall. Hydrogen gas and oxygen gas were supplid to the anode chamber and the cathode chamber each at a flow rate of 10 ml/minute. The unaltered gases were withdrawn from the apparatus. The ends of the leading wires were connected to an ammeter and a voltmeter to effect measurement of electromotive force. The results of the measurement were as shown in FIG. 6. In the measurement, the operation was performed at normal room temperatures and the area of electrodes was fixed at 0.385.

It is clear from FIG. 6 that the terminal voltage is about 0.95 V when the current density is 0 and it is about 0.45 V when the terminal voltage is 100 mA/cm², indicating that the present fuel cell is substantially equal in performance to the fuel cell using a conventional liquid electrolyte.

EXAMPLE 8

In a fuel cell having a structure like the one illustrated in FIG. 3, a shaped piece (measuring 2.5cm² in surface area and 1.5mm in thickness) formed of the compound $H_3[PW_{12}O_{40}]\cdot 30H_2O$ obtained in Example 2 was used as the partition wall. Hydrogen gas and oxygen gas were supplied to the anode chamber and the cathode chamber each at a flow rate of 10 ml/minute, with the resultant electromotive force measured to obtain an amperage-voltage curve. The results of the measurement were substantially the same as those of the graph shown in FIG. 6. In this measurement, the operation was performed at normal room temperature and the area of electrode was fixed at 0.385cm².

EXAMPLE 9

In fuel cells having a structure like the one illustrated in FIG. 3, permselective members made of single crystals of $H_3[PMo_{12}O_{40}]\cdot 30H_2O$, $H_3[PW_{12}O_{40}]\cdot 30H_2O$, $H_{10}[Al_2W_{22}O_{74}]\cdot 44H_2O$, $H_4[SiW_{12}O_{40}]\cdot 30H_2O$ and $H_5[BW_{12}O_{40}]\cdot 30H_2O$ were used each as the permselective member. The fuel cells were operated under the conditions identical to those of Example 8 above and the resultant electromove forces were measured. The results of the measurement were substantially the same as those of the graph shown in FIG. 6.

EXAMPLE 10

Figure 7:
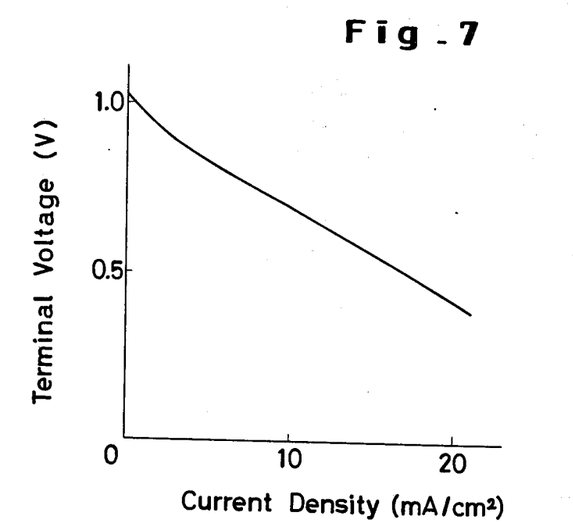
FIG. 7 is a graph showing the relation between voltage and amperage measured of the fuel cell using the permselective member as another preferred embodiment of this invention.

In a fuel cell having a structure like the one illustrated in FIG. 3, a permselective member formed of the compound $K_{10}[PW_{17}O_{61}]\cdot 22H_2O$ was used. While the fuel cell was operated under the conditions identical to those of Example 8, the resultant electromotive force was measured. The results of the measurement were as shown in FIG. 7.

EXAMPLE 11

In an apparatus having a structure like the one illustrated in FIG. 4, a shaped piece (measuring 2.5cm² in surface area and 2mm in thickness) formed of the compound $H_3[PMo_{12}O_{40}]\cdot 30H_2O$ was used as the partition wall, with a platinum black sheet disposed as the catalyst on each of the surfaces of said partition wall. The interior of the cathode chamber was displaced with hydrogen gas and reduced to a pressure of 0.1 atmosphere. And an electrical potential of 2 V was applied to said partition wall. When steam was subsequently supplied to the anode chamber at a flow rate of 10 ml/minute, hydrogen having a purity close to 100% was recovered at a rate of 1.3 ml/minute. In this treatment, the operation was carried out at normal room temperature and the area of electrode was fixed at 0.385cm².

EXAMPLE 12

In apparatuses having a structure like the one illustrated in FIG. 4, shaped pieces formed of $K_3[PMo_{12}O_{40}]\cdot 6H_2O$, $CuO\cdot 12WO_3\cdot 30H_2O$, $H_3[PMo_{12}O_{40}]\cdot 30H_2O$ (single crystal), $H_3[PW_{12}O_{40}]\cdot 30H_2O$ (single crystal), $H_{10}[Al_2W_{22}O_{74}]\cdot 44H_2O$, $H_4[SiW_{12}O_{40}]\cdot 30H_2O$, $H_5[BW_{12}O_{40}]\cdot 30H_2O$, $K_{10}[P_2W_{17}O_{61}]\cdot 22H_2O$, $Na_3[AlMo_6O_{21}]\cdot 11H_2O$, $(NH_4)_6[MnMo_9O_{32}]\cdot 8H_2O$ and $(NH_4)_8[CeMo_{12}O_{42}]\cdot 8H_2O$ were used each as the permselective member. These apparatuses were operated under conditions identical with those of Example 11. In all the operations, hydrogen gas having a purity close to 100% was obtained at a ratio of 1.3 ml/minute.

EXAMPLE 13

The same apparatus as described in Example 11 was operated under the same conditions, except that an equivoluminal mixed gas (1:1) of air and hydrogen was supplied in place of steam at a flow rate of 10 ml/minute to the anode chamber. Consequently, hydrogen gas having a purity close to 100% was recovered at a rate of 1.3 ml/minute.

In apparatuses of the same structure as above, shaped pieces formed of $H_3[PMo_{12}O_{40}]\cdot 30H_2O$ (single crystal), $H_3[PW_{12}O_{40}]\cdot 30H_2O$ (single crystal), $H_{10}[Al_2W_{22}O_{74}]\cdot 44H_2O$, $H_4[SiW_{12}O_{40}]\cdot 30H_2O$, $H_5[BW_{12}O_{40}]\cdot 30H_2O$, $K_{10}[P_2W_{17}O_{61}]\cdot 22H_2O$, $Na_3[AlMo_6O_{21}]\cdot 11H_2O$, $(NH_4)_6[MnMo_9O_{32}]\cdot 8H_2O$ and $(NH_4)_8[CeMo_{12}O_{42}]\cdot 8H_2O$ were used each as the permselective member. When these apparatuses were operated similarly, hydrogen gas having a purity close to 100% was invariably recovered in all the operations.

EXAMPLE 14

Figure 8:
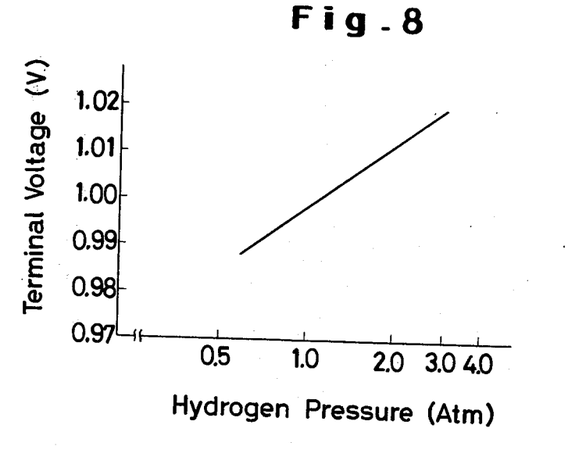
FIG. 8 is a graph showing the relation between the partial pressure of the hydrogen and terminal voltage generated of the hydrogen detecting apparatus using the permselective member as one preferred embodiment of the present invention.

The same apparatus as described in Example 11 was operated under the same conditions, except that a high-impedance voltmeter was used in place of the application of electrical potential of 2 V, that one atmospheric pressure of oxygen gas was sealed in the cathode chamber and that hydrogen gas was supplied to the anode chamber while partial pressure of the hydrogen gas was varied. The results thus obtained were as shown in FIG. 8. When the partial pressure of the hydrogen gas was 1.0 the voltmeter indicated a value of about 0.998 V, whereas when the partial pressure was 3.0 it indicated a value of about 1.02 V.

When $H_3[PW_{12}O_{40}]\cdot 30H_2O$ and $K_3[PW_{12}O_{40}]\cdot 6H_2O$ were used as the partition wall in place of $H_3[PMo_{12}O_{40}]\cdot 30H_2O$ used in Example 11, substantially the same results as described above were obtained.

EXAMPLE 15

The same apparatus as described in Example 14 was operated under the same conditions, except that the interior of the anode chamber was displaced with hydrogen gas and that of the cathode chamber was displaced with argon gas and carbon dioxide from the gas cylinders available on the market. In the case of introduction of the argon gas, the apparatus functions as a hydrogen concentration cell and the terminal voltage was about 0.60 V. In the case of introduction of the carbon dioxide, the terminal voltage was about 0.62 V and relative amount of oxygen gas contained as impurities in the carbon dioxide was measured.

EXAMPLE 16

In an apparatus having a structure like the one illustrated in FIG. 5, $H_3[PMo_{12}O_{40}]\cdot 30H_2O$ was used as the partition wall. A high-impedance voltmeter was connected to the leading wire. One atmospheric pressure of oxygen gas was sealed in the cathode chamber and the anode side of the apparatus was introduced at room temperatures into chambers, partial pressures of hydrogen in which were different from one another. Consequently, the terminal voltages thus generated were based upon the partial pressures of hydrogen and the results obtained were substantially the same as those of the graph shown in FIG. 8.

What is claimed is:

1. A proton permselective solid-state member, formed by shaping at least one member selected from the group consisting of heteropoly acids represented by the generic formula:

wherein, X stands for at least one member selected from the group consisting of boron, aluminum, gallium, silicon, germanium, tin, phosphorus, arsenic, antimony, bismuth, selenium, tellurium, iodine and transition metals belonging to the fourth, fifth and sixth periods of the Periodic Table, Y is at least one member selected from transition metals belonging to the fourth, fifth, and sixth periods of the Periodic Table, and wherein $m$ has a value of from 2 to 10, $y$ has a value of from 1 to 12, $n$ has a value of from 3 to 100 all based on X taken as 1 and $z$ has a positive numerical value and salts of said acids.

2. The permselective member according to claim 1, wherein different transition metals are used as the substituents X and Y of the formula.

3. The permselective member according to claim 1, wherein said shaping of a heteropoly acid or salt thereof is carried out under a pressure of not less than 100 kg/cm².

4. The permselective member according to claim 3, wherein said shaping under pressure is carried out after a fluorine resin has been incorporated into the heteropoly acid or salt thereof.

5. The permselective member according to claim 4, wherein said fluorine resin is incorporated in the amount of 0.5% by weight.

6. An apparatus having an anode chamber and a cathode chamber separated from each other by a partition wall provided with catalysts and leading wires on the surfaces thereof facing said anode and cathod chambers, said partition wall being an article obtained by shaping at least one member selected from the group consisting of heteropoly acids represented by the generic formula:

wherein, X stands for at least one member selected from the group consisting of boron, aluminum, gallium, silicon, germanium, tin, phosphorus, arsenic, antimony, bismuth, selenium, tellurium, iodine and transition metals belonging to the fourth, fifth and sixth periods of the Periodic Table, Y for at least one member selected from transition metals belonging to the fourth, fifth and sixth periods of the Periodic Table, and wherein $m$ has a value of from 2 to 10, $y$ has a value of from 1 to 12, $n$ has a value of from 3 to 100, all based on X as taken 1 and $z$ has a positive numerical value and salts of said acids.

7. The apparatus according to claim 6, further comprising means for supplying hydrogen gas to said anode chamber and oxygen gas to said cathode chamber, whereby electromotive force is detected through said leading wires.

8. The apparatus according to claim 6, further comprising means for supplying steam to said anode chamber and hydrogen gas to said cathode chamber and means for applying DC voltage to said partition wall for the purpose of electrolyzing said steam, whereby hydrogen is recovered.

9. The apparatus according to claim 6, further comprising means for supplying hydrogen-containing gas to said anode chamber and hydrogen gas to said cathode chamber and means for applying DC voltage to said partition wall for the purpose of causing proton alone in said anode chamber to penetrate into said cathode chamber, whereby hydrogen is purified.

10. The apparatus according to claim 6, further comprising means for supplying hydrogen gas to said anode chamber and oxygen-containing gas to said cathode chamber and a voltmeter connected to said leading wires, whereby existence of oxygen is detected.

11. The apparatus according to claim 6, further comprising means for supplying oxygen gas to said anode chamber and hydrogen-containing gas to said cathode chamber and a voltmeter connected to said leading wires, whereby existence of hydrogen is detected.

12. The apparatus according to claim 10, whereby the partial pressure of the oxygen is measured by the electromotive force indicated in said voltmeter.

13. The apparatus according to claim 11, whereby the partial pressure of the hydrogen is measured by the electromotive force indicated in said voltmeter.

* * * * *

UNITED STATES PATENT AND TRADEMARK OFFICE
CERTIFICATE OF CORRECTION

PATENT NO. : 4,024,036

DATED : May 17, 1977

INVENTOR(S) : Osamu Nakamura, et al

It is certified that error appears in the above–identified patent and that said Letters Patent are hereby corrected as shown below:

In the title of the Invention,

[54] Change spelling of "Permeselective" to --Permselective--

Signed and Sealed this second Day of August 1977

[SEAL]

Attest:

RUTH C. MASON  
*Attesting Officer*

C. MARSHALL DANN  
*Commissioner of Patents and Trademarks*